US008516394B2

(12) United States Patent
Lee et al.

(10) Patent No.: US 8,516,394 B2
(45) Date of Patent: Aug. 20, 2013

(54) APPARATUS AND METHOD FOR ADJUSTING CHARACTERISTICS OF A MULTIMEDIA ITEM

(75) Inventors: Bong Won Lee, Seoul (KR); Nho Kyung Hong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 816 days.

(21) Appl. No.: 12/690,279

(22) Filed: Jan. 20, 2010

(65) Prior Publication Data
US 2010/0192104 A1 Jul. 29, 2010

(30) Foreign Application Priority Data
Jan. 23, 2009 (KR) .................. 10-2009-0006197

(51) Int. Cl.
*G06F 3/048* (2006.01)
(52) U.S. Cl.
USPC ............ 715/834; 715/833; 715/974; 715/727
(58) Field of Classification Search
USPC .................................. 715/834, 833, 727, 974
See application file for complete search history.

(56) References Cited

U.S. PATENT DOCUMENTS

| | | | | |
|---|---|---|---|---|
| 6,710,771 B1* | 3/2004 | Yamaguchi et al. | .......... | 345/184 |
| 2003/0048309 A1* | 3/2003 | Tambata et al. | ............... | 345/810 |
| 2003/0197724 A1* | 10/2003 | Reed | .............................. | 345/738 |
| 2005/0081164 A1* | 4/2005 | Hama et al. | .................... | 715/830 |
| 2005/0183040 A1* | 8/2005 | Kondo et al. | ................. | 715/841 |
| 2005/0262451 A1* | 11/2005 | Remignanti et al. | .......... | 715/833 |
| 2007/0152979 A1* | 7/2007 | Jobs et al. | ...................... | 345/173 |
| 2007/0168890 A1* | 7/2007 | Zhao et al. | ..................... | 715/863 |
| 2008/0040671 A1* | 2/2008 | Reed | .............................. | 715/738 |
| 2008/0049943 A1* | 2/2008 | Faller et al. | ...................... | 381/17 |
| 2008/0158151 A1* | 7/2008 | Wang et al. | ................... | 345/156 |
| 2009/0019401 A1* | 1/2009 | Park et al. | ...................... | 715/841 |
| 2009/0058801 A1* | 3/2009 | Bull | .............................. | 345/157 |
| 2009/0067634 A1* | 3/2009 | Oh et al. | .......................... | 381/17 |
| 2009/0117943 A1* | 5/2009 | Lee et al. | ...................... | 455/566 |
| 2009/0183100 A1* | 7/2009 | Eom et al. | ...................... | 715/769 |
| 2009/0187860 A1* | 7/2009 | Fleck et al. | .................... | 715/834 |
| 2009/0290725 A1* | 11/2009 | Huang | .......................... | 381/103 |
| 2010/0058228 A1* | 3/2010 | Park | .............................. | 715/786 |

* cited by examiner

Primary Examiner — Patrick Riegler
(74) Attorney, Agent, or Firm — Cha & Reiter, LLC.

(57) ABSTRACT

An apparatus and a method for adjusting a characteristic of a multimedia item are provided. The apparatus and method includes an auxiliary execution region and an execution region for adjusting a sound resource of a multimedia item, outputs a sound resource adjustment list on the auxiliary execution region according to the selection of a function of sound resource adjustment selected on the execution region, and outputs indexes capable of controlling a value of a corresponding sound resource adjustment if a specific sound resource adjustment item is selected. In this respect, the apparatus and method easily processes the sound resource adjustment based on the execution region and auxiliary execution region.

14 Claims, 6 Drawing Sheets

APPARATUS AND METHOD FOR ADJUSTING CHARACTERISTICS OF A MULTIMEDIA ITEM

CLAIM OF PRIORITY

This application claims, pursuant to 35 USC 119, priority to, and the benefit of the earlier filing date of, Korean Patent Application No. 10-2009-0006197 filed in the Korean Intellectual Property Office on Jan. 23, 2009, the entire contents of which are incorporated herein by reference.

BACKGROUND OF THE INVENTION

1. Field of the Invention

The present invention relates to the filed of multimedia presentation and more particularly to an apparatus and a method for adjusting a multimedia item.

2. Description of the Related Art

The rapid development of communication technology has facilitated the gradual expansion of the function of a portable terminal, and in this respect, various User Interfaces (UI) and various functions using the UIs have been provided.

When reproducing a multimedia item, e.g. music content, in a portable terminal, the portable terminal provides an object corresponding to sound resource information and image information regarding a multimedia item, e.g. music content, through a display means. Further, the portable terminal indicates that the item, e.g. music content is being reproduced through an object, such as a reproducing progress bar and a graphic equalizer, in addition to the object. Furthermore, if it is desired to adjust the sound resource of the multimedia item, e.g. to change a sound field effect, the conventional portable terminal activates a screen for a sound change and changes the sound resource on the corresponding screen.

However, in order to perform such an operation, the conventional portable terminal requires a shift to each corresponding screen. Therefore, a user of the portable terminal must recognize which screen is currently activated and what kind of screens associated with the screen used for the current task are provided so as to perform the entire operation. That is, if the user forgets or fails to remember the above items, such as the type of previous screen, during the operation, there is a burden in identifying the provided screens while searching for each screen.

SUMMARY OF THE INVENTION

The present invention provides an apparatus and a method for adjusting a multimedia item which allows for access of information required for the adjustment of the multimedia item and selects and activates the corresponding information to directly adjust the sound resource.

In accordance with an aspect of the present invention, an apparatus for adjusting a multimedia item includes a display means including an auxiliary execution region for displaying information for adjusting a sound resource of the multimedia item and an execution region for generating an input signal capable of indicating or selecting information outputted on the auxiliary execution region, and a controller for controlling reproduction of the multimedia item and the adjustment of the sound resource according to the input signal, wherein the auxiliary execution region includes at least one of an auxiliary information display region for outputting a list of the sound resource adjustment and at least one from indexes corresponding to a size value of at least one sound resource adjustment item in the list of the sound resource adjustment during performing a function for adjusting the sound resource of the multimedia item, and an auxiliary wheel region for generating an input signal for selecting at least one item in the list of the sound resource adjustment according to a touch event and an input signal capable of selecting the size value of the selected sound resource adjustment item.

In accordance with another aspect of the present invention, a method for adjusting a multimedia item includes outputting information related to the multimedia item and reproduction information according to reproduction of the multimedia item on an auxiliary execution region of a display means, selecting a function of sound resource adjustment of the multimedia item using an execution region including a touch wheel region and a confirmation key map region, the execution region being outputted on the display means, outputting a list of sound resource adjustments on the auxiliary execution region according to the selection of the function of the sound resource adjustment, and selecting at least adjustment among the list of adjustments outputted on the auxiliary execution region.

As described above, according to the apparatus and method for adjusting a feature of the multimedia item present, it is possible to rapidly and conveniently adjust a feature of the multimedia item, e.g. the sound resource, without any additional screen shift.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A portable terminal including an adjustment means for reproducing a multimedia item according to an embodiment of the present invention will be described with reference to accompanying drawings. However, the portable terminal of the present invention is not limited to the following description and can be applied to various types of devices.

The present invention to be described hereinafter provides regions for outputting information or activating a touch sensor located in an output printed information region so as to adjust a characteristic of a multimedia item, e.g. a sound resource. The regions include an execution region corresponding to a first region for selecting the multimedia item, for selecting a menu for changing a characteristic of the multimedia item, and for changing a setting value of a selected menu, and an auxiliary execution region corresponding to a second region for generating an input signal for changing a characteristic of the multimedia item or outputting information related to the multimedia item based on the first region. In particular, the regions outputted on the display means include the first region outputted on one side of the display means for selecting the multimedia item, and the like, and the second region for changing the characteristic of the selected multimedia item according to the input signal generated based on the first region or an input signal generated from other input means provided in the portable terminal, the second region being different from the first region. For example, if the first region is outputted on a right edge of the display means, the second region may be outputted inclined to a center or a left side of the display means. Further, the second region can be outputted according to the selection of the multimedia item in a state where the first region is outputted in a certain region of the display means and can be removed when the multimedia item is removed. The first region can maintain its output status even if the second region is removed.

The first region is referred to as the execution region and the second region is referred to as the auxiliary execution region. However, it would be recognized that the regions of the present invention are not limited to the described reference name, but rather the names are chosen to present the invention claimed in clear and concise form.

Figure 1:
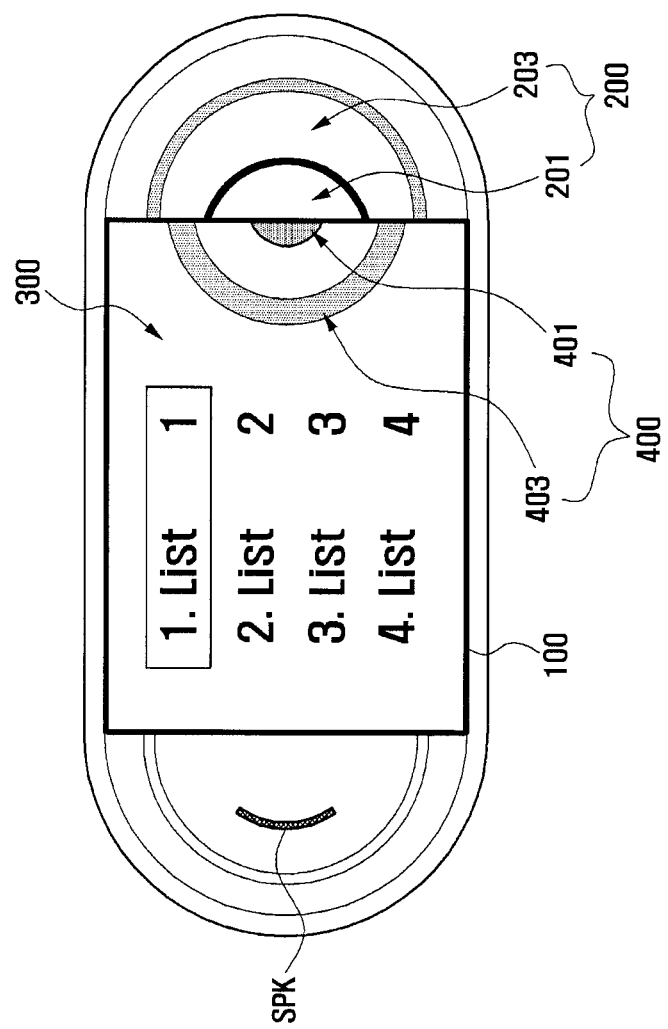
FIG. 1 is a diagram schematically illustrating a portable terminal according to an exemplary embodiment of the present invention.

FIG. 1 is a diagram schematically illustrating the portable terminal according to an exemplary embodiment of the present invention.

Referring to FIG. 1, the portable terminal of the present invention includes a display means 100 in which an output region 300 and an execution region 400 are located, an input means 200, and a speaker SPK for outputting an audio signal according to reproducing the multimedia item.

The portable terminal of the present invention having the above construction outputs a menu image in the output region 300 according to the input signal generated by the input means 200, sets a certain region of the display means 100 as the output region 300 as shown in FIG. 1 if a menu capable of selecting a multimedia item in the outputted menu display, and outputs a list of the multimedia items on the corresponding output region 300. The portable terminal can set another region of the display means 100 as the execution region 400. The execution region 400 may include a touch wheel region 403 for selecting the multimedia item and a confirmation key map region 401. If the display means 100 is changed so as to include the output region 300 outputting the list of the multimedia items and the execution region 400 in a state of the menu image being outputted, the portable terminal may reset the touch sensors so that the touch sensor of the output region 300 becomes inactivated and the touch sensor of the execution region 400 is controlled to activate the corresponding region, i.e. the touch wheel region 403 and confirmation key map region 401. To this end, the display means 100 can be implemented with a touch screen. That is, the display means 100 can have a structure equipped with a display panel and a touch sensor. The display panel outputs an image according to the reproduction of various contents stored in a storage unit or an image according to the activation of a function of the portable terminal. The touch sensor can be arranged in a matrix form in a region of the display panel, and if a user touches certain images outputted on the display panel, the touch sensor can be partially activated so as to provide an effect according to the touching of the corresponding image. That is, the touch sensor is activated on the entire display panel or activated on a certain region and inactivated in another region according to the control of a controller of the portable terminal. Especially, the touch sensor of the present invention maintains its inactive state on the output region 300 and the touch sensor of the execution region 400 can be activated on the region corresponding to the corresponding images, i.e. the touch wheel region 403 and confirmation key map region 401.

As described above, the execution region 400 includes the touch wheel region 403 and the confirmation key map region 401. The touch wheel region 403 may be shaped like a semi-circle band as shown in FIG. 1. The touch wheel region 403 provides a directional property according to the touch of the user. That is, if the user performs a drag action by touching down on a specific point of the touch wheel region 403 and moving along a surface of the display means 100 while maintaining contact with the display means 100, the execution region 400 detects a direction of the drag action and transfers the detected direction to the controller of the portable terminal. The controller of the portable terminal controls and moves a highlight designating the multimedia item outputted on the output region 300 according to the detected direction. Further, the confirmation key map region 401 can generate the input signal capable of selecting the multimedia item designated by the highlight among the multimedia items outputted on the output region 300 according to the touch. That is, as shown in FIG. 1, if touch is generated on the confirmation key map region 401 in a state where the highlight designates "List 1" of the output region 300, the confirmation key map region 401 generates an input signal according to the selection of "List 1" to transfer the generated input signal to the controller.

The output region 300 may include the remaining region of the display means 100, except for the execution region 400. The output region 300 outputs a menu requested by the user or the multimedia item as shown in FIG. 1 according to the control of the controller. It is assumed for the description that the output region 300 of the present invention displays 4 multimedia items, i.e. "List 1, List 2, List 3, and List 4". However, the present invention is not limited thereto and can output more or less than 4 multimedia items. When outputting a large number of multimedia items, the output region 300 controls and outputs index information, e.g. a size of a text or an image, of the multimedia item outputted while taking the entire space of the display means 100 into consideration. Or, the output region 300 outputs a list including the predetermined number of multimedia items and a scroll bar indicating the existence of additional multimedia items. If the scroll bar is outputted, the user shifts the highlight using the touch wheel 403 of the execution region 400 so that the touch action is not required for applying an additional scroll bar.

The input means 200 can be implemented with a touch pad. The touch wheel region 403 and confirmation key map region 401 of the display means 100 are implemented by software, but the input means 200 is implemented by hardware so that there is no change or shift of the input means 200. That is, the input means 200 has a fixed form. The input means 200 includes a wheel pad region 203 and a confirmation key region 201. The wheel pad region 203 is a region for recognizing the drag action of moving while maintaining the contact action of the user. That is, when a drag signal moving in a certain direction within a semicircle band after the touching of the certain point is generated, the wheel pad region 203 can recognize a corresponding touch event as a drag signal having the certain direction, similarly with the function of the touch wheel region 403. The confirmation key region 201 is a region supporting a function identical to that of the confirmation key map region 401 and generates a key input signal set by touching, e.g. the input signal corresponding to the confirmation key.

The input means 200 is implemented by hardware and the execution region 400 is implemented by software. However, in view of an exterior appearance, the certain region of the display under software control is adjacent to the certain region of under hardware control so that they are possibly seen as being connected with each other. The input means 200 and the execution region 400 provide continuity of the action. That is, a wheel pad 203 and the touch wheel 403 of the execution region 400 are connected to each other to generate a wheel input signal formed in an annular band. Further, the confirmation key map region 401 of the execution region 400 and the confirmation key region 201 of the input means 200 can generate an identical input signal corresponding to the tough generated in at least one region among the two regions, e.g. the input signal corresponding to "confirmation". Accordingly, if the user of the portable terminal desires to generate a wheel input signal, the portable terminal of the present invention can generate the wheel input signal within a boundary point of the execution region 400 and a region of the input means 200 without interruption. To this end, the controller of the portable terminal controls and recognizes the touch signal generated from the touch wheel 403 and the touch signal generated from the wheel pad 203 as the input signal for the same operation. To be similar with this, the controller of the portable terminal controls and recognizes the input signals generated from the confirmation key map region 401 and the confirmation key region 201 as a single confirmation key input signal.

In the meantime, if the input signal corresponding to confirmation is generated from at least one from the execution region 400 and input means 200 in a state where one of the multimedia items among the multimedia items outputted on the output region 300 is indicated, the indicated multimedia item is reproduced (activated, executed). Especially, the portable terminal of the present invention supports more intuitive and convenient adjustments of the selected multimedia item, which will be described in more detail with reference to FIGS. 2 to 5.

Figure 2:
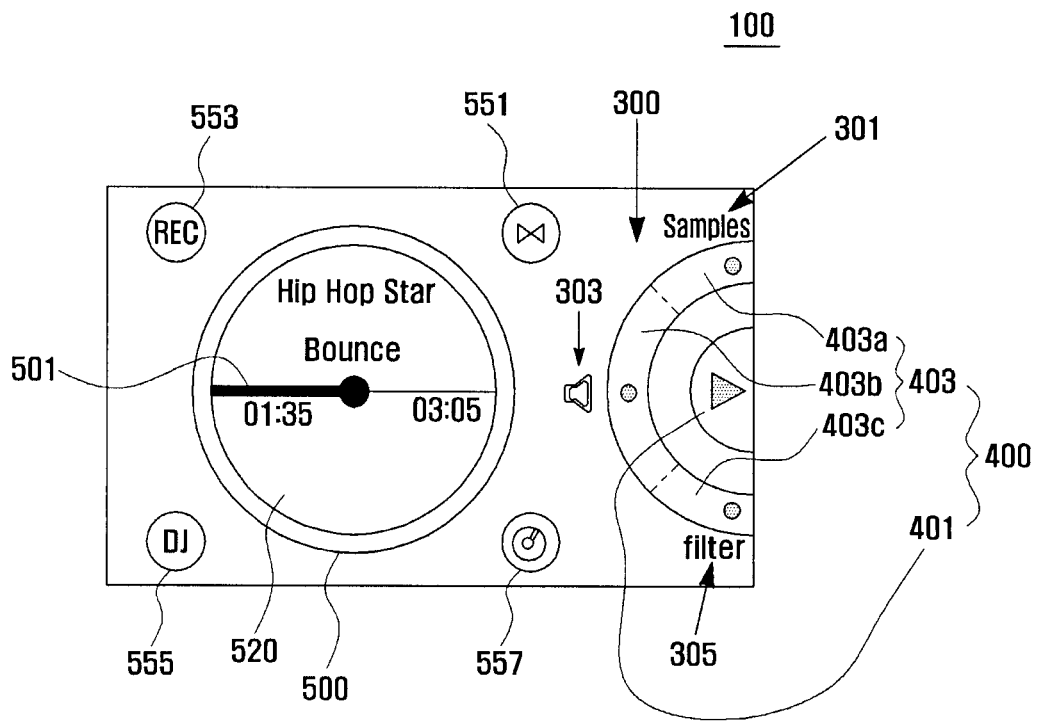
FIG. 2 is a diagram illustrating a screen corresponding to a display means including an auxiliary execution region according to an exemplary embodiment of the present invention.

FIG. 2 illustrates an interface image illustrating one example of the display means 100 according for reproducing the multimedia item according to the embodiment of the present invention.

Referring to FIG. 2, the display means 100 of the present invention includes output region 300 which further includes an auxiliary execution region 500, execution region 400, and a button control part 550

Here, a specific region of the auxiliary execution region 500, the button control part 550, and the execution region 400 generate input signals in accordance with a touch event of the user, respectively, and transfer the generated input signal to the controller of the portable terminal. That is, the specific region of the auxiliary execution region 500, the button control part 550, and the execution region 400 serve as input means. To this end, the portable terminal controls and activates the touch sensor arranged on the specific region of the auxiliary execution region 500, the button control part 550, and the execution region 400. The button control part 550 is removed from the display means or provided as an option according to the settings of the user or the intention of a designer and then is outputted on the display means 100 in accordance with the setting.

The auxiliary execution region 500 can be generated when one of the multimedia items outputted on the output region 300 is activated, as shown in FIG. 1. For example, if "List 1" is activated, the controller of the portable terminal controls the output of an auxiliary information display region 520 that displays information corresponding to "List 1". The auxiliary information display region 520 outputs information related to the multimedia item and reproduction information. That is, if the multimedia item is the music contents, the auxiliary information display region 520 outputs information related on the selected multimedia item (i.e., List 1), such as a music title of "Hip Hop Star", a name of a singer "Bounce", the total reproduction time of the entire song "03:05", and the reproduced time until now "01:35". If the auxiliary execution region 500 is displayed in a circle shape, the reproduction information can be displayed in a shape of a progress bar 501 horizontally passing through a center of a circle. An initial state of the progress bar 501 has a predetermined thickness and if a progress point moves in a predetermined direction, e.g. from a left side to a right side, according to the reproduction of the multimedia item, a progressed region based on the progress point is more thickly displayed than a non-progressed region.

The button control part 550 includes a plurality of buttons, e.g. a first button 551, a second button 553, a third button 555, and a fourth button 557. The button control part 550 outputs more or less buttons on the output region 300 depending on the support from the portable terminal. Each button included in the button control part 550 is a button capable of providing a specific function in relation to the reproduction adjustment of the currently reproduced multimedia item. For example, the first button 551 may be a button instructing the reproduction termination of the currently activated multimedia item. If the user of the portable terminal touches the first button 551, the controller of the portable terminal controls and terminates the reproduction of the currently reproduced multimedia item and outputs the previous screen, e.g. the image of the list of the multimedia item shown in FIG. 1, or outputs a predetermined image. The second button 553 may be a button generating an input signal instructing voice recording or video recording. The user of the portable terminal performs a specific operation based on the currently reproduced multimedia item using the second button 553 and then stores the corresponding information. The third button 555 may be a button supporting a DJ function for the multimedia item. If the user of the portable terminal activates the third button 555, the user controls the reproduction of the multimedia item using the DJ function. The fourth button 557 may be a reservation button capable of activating a function optionally set by the user. For example, the portable terminal may provide a menu capable of setting the function of the fourth button 557 and the user can set the specific function of the fourth button 557 through the menu. Thereafter, when the fourth button 557 is activated, the set specific function is applied to the multimedia item. Meanwhile, it has been described in the above description as the first to fourth buttons 551 to 557 perform the reproduction termination, recording, DJ function, reservation function, but those buttons can be defined as the buttons generating input signals corresponding to other functions, e.g. a sound resource adding function, sound resource removing function, or the like, according to the intention of the designer.

The output region 300 is a region exclusive of the auxiliary execution region 500, button control part 550, and execution region 400, which provides a background with a specific color according to the user's intention of the interface implementation. That is, in order to enhance the operability of the auxiliary execution region 500, button control part 550, and execution region 400, the output region 300 has a color contrary to that assigned to the auxiliary execution region 500, button control part 550, and execution region 400 or a color making those constructions outstanding. Further, the output region 300 outputs other information, e.g. text information or image information related to the currently activated multimedia item. Further, the output region 300 outputs a text or an image corresponding to a function description for a partial region of the touch wheel region 403 so as to use the touch wheel region 403 of the execution region 400 as a key map. Referring to FIG. 2, the output region 300 outputs "Samples" 301 describing a first touch wheel region 403a among the touch wheel region 403, an icon 303 corresponding to a volume control function, the icon 303 describing a second touch wheel region 403b, and "Fiber" 305 describing a third touch wheel region 403c. The touch wheel region 403 of the execution region 400 can be divided in a larger number of partial regions, and the output region 300 consequently outputs more text or images for describing the function of each divided partial region.

The execution region 400 includes the touch wheel region 403 in which the touch sensor is activated to serve as the input means and the confirmation key map region 401. The touch wheel region 403 can be divided into the partial regions for performing the specific function as described above. If the controller of the portable terminal controls the operation so as not to output additional text information or image information on the touch wheel region 403 and if the user touches the screen, the controller may recognize the touch and control the output of the aforementioned text information or image information on the output region 300. Further, if the touch event is completed, the controller of the portable terminal may remove the text information or image information from the output region 300.

As described above, if the multimedia item is selected, the portable terminal, according to the embodiment of the present invention, outputs information related to the corresponding multimedia item and information related to the reproduction of the selected multimedia item on the auxiliary execution region 500. Further, the portable terminal of the present invention can re-define the execution region 400 so as being capable of selecting an item for adjusting a feature or characteristic, e.g., the sound resource, of the multimedia item.

Figure 3:
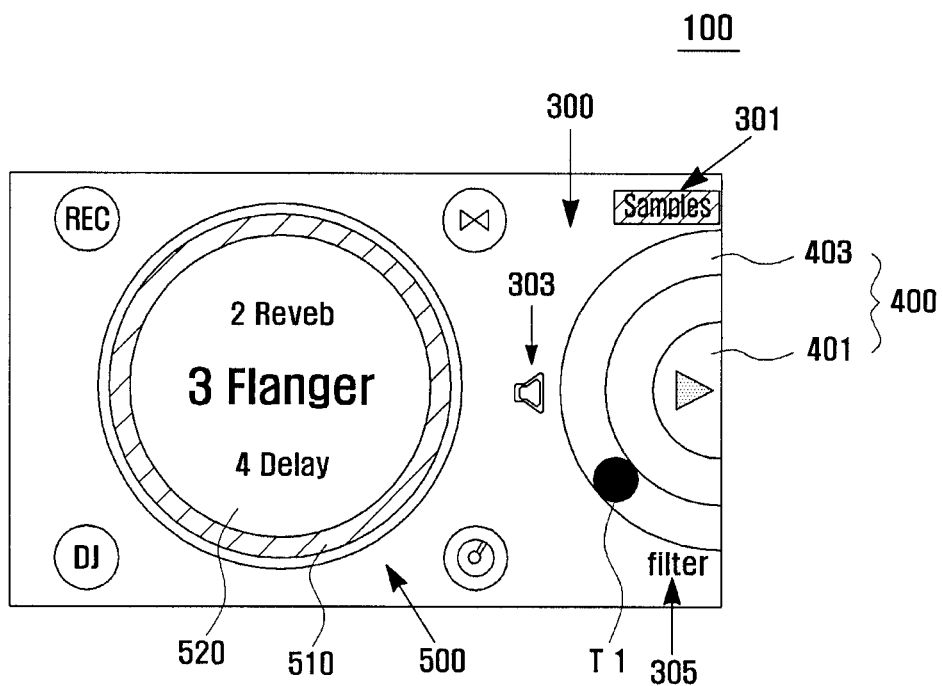
FIG. 3 is a diagram illustrating a screen corresponding to an auxiliary execution region indicating a sound resource adjustment list according to an exemplary embodiment of the present invention.

FIG. 3 is an interface image for describing a change of the auxiliary execution region 500 according inputs entering into the execution region 400 according to the embodiment of the present invention.

Referring to FIG. 3, if a first touch T1 is generated on the first touch wheel region 403a (not shown)) and the first touch T1 is rotated in a predetermined direction, e.g. in a down direction, toward region 403c, the display means 100 of the present invention represents the change of the interface outputted on the auxiliary execution region 500 according to the direction of rotation. To explain in more detail, the user of the portable terminal can touch the first touch wheel region 403a (FIG. 2). In this case, as shown in FIG. 3, the portable terminal changes "Samples" 301 that is outputted on the output region so as to indicate a state where the first touch wheel region 403a is touched. That is, "Samples" 301 can be displayed in a different color (as shown with hashed markings) from that of information of other peripheral output region 300, e.g. the icon 303 or filter 305. In the meantime, if the touch is generated on the first touch wheel region 403a, the difference with other touch wheel regions, i.e. the second touch wheel region 403b and third touch wheel region 403c, disappears and those touch wheel regions serve as one continuous wheel region. That is, if the user touches the first touch wheel region 403a having "Samples" 301 function, other touch wheel region can be operated by the expansion of the first touch wheel region 403a. Accordingly, the portable terminal generates a drag signal related to the first touch wheel region 403a if the user touches the first touch wheel region 403a and then drags past the part that are designated second touch wheel region 403b and third touch wheel region 403c.

In the meantime, if the first touch wheel region 403a is touched, the portable terminal controls and outputs a list for selecting a function mapped on the first touch wheel region 403a, e.g. the sound field effect of the DJ function, on the auxiliary execution region 500. That is, the auxiliary execution region 500 outputs a sound resource adjustment list including various samples, e.g. "2 reverb", "3 Flanger", "4 Delay", on the auxiliary information display region 520 according to the activation of the first touch wheel region 403a. The sound resource adjustment list including "reverb", "Flanger", and "Delay" is a sample of the sound resource adjustment effects capable of being provided by the portable terminal according to the activation of the first touch wheel region 403a. Each item in the sound resource adjustment list outputted on the auxiliary information display region 520 can be switched in their locations according to the drag signal generated on the execution region 400. That is, if the touch is generated in the first touch wheel region 403a and then the first touch T1 downwardly moves as shown in FIG. 3, the portable terminal recognizes that the downward drag signal is generated and consequently performs the location switch (not shown) of the sound resource adjustment items shown in display 520. Further, the auxiliary execution region 500 outputs the auxiliary wheel region 510 and the portable terminal switches the locations of the sound resource adjustment items included in the sound resource adjustment list according to the touch event generated in the auxiliary wheel region 510. For example, if there is a list including a total of 10 sound resource adjustment items and three sound resource adjustment items are outputted on the auxiliary information display region 520, the portable terminal controls the location of each item in the sound resource adjustment list having a certain sequence to be changed according to the generated drag signal. At this time, in order to discriminate between the designated item from other items, the auxiliary information display region 520 controls and displays the designated item in a thicker character and larger font than other items. Referring to FIG. 3, "3 Flanger" is currently indicated on the auxiliary execution region and the portable terminal changes the location of the sound resource adjustment items in a certain direction by the drag signal according to the first touch T1 and outputs the sound resource adjustment items on the auxiliary information display region 520.

In the meantime, the portable terminal controls and initiates the touch sensor in a location corresponding to "3 Flanger" so as to allow the user directly select "3 Flanger" displayed on the auxiliary information display region 520. If "3 Flanger" is selected in the auxiliary execution region 500, the auxiliary execution region 500 outputs information capable of adjusting "Flanger" so as to control a value of "3 Flanger" i.e. the sound resource adjustment item.

Figure 4:
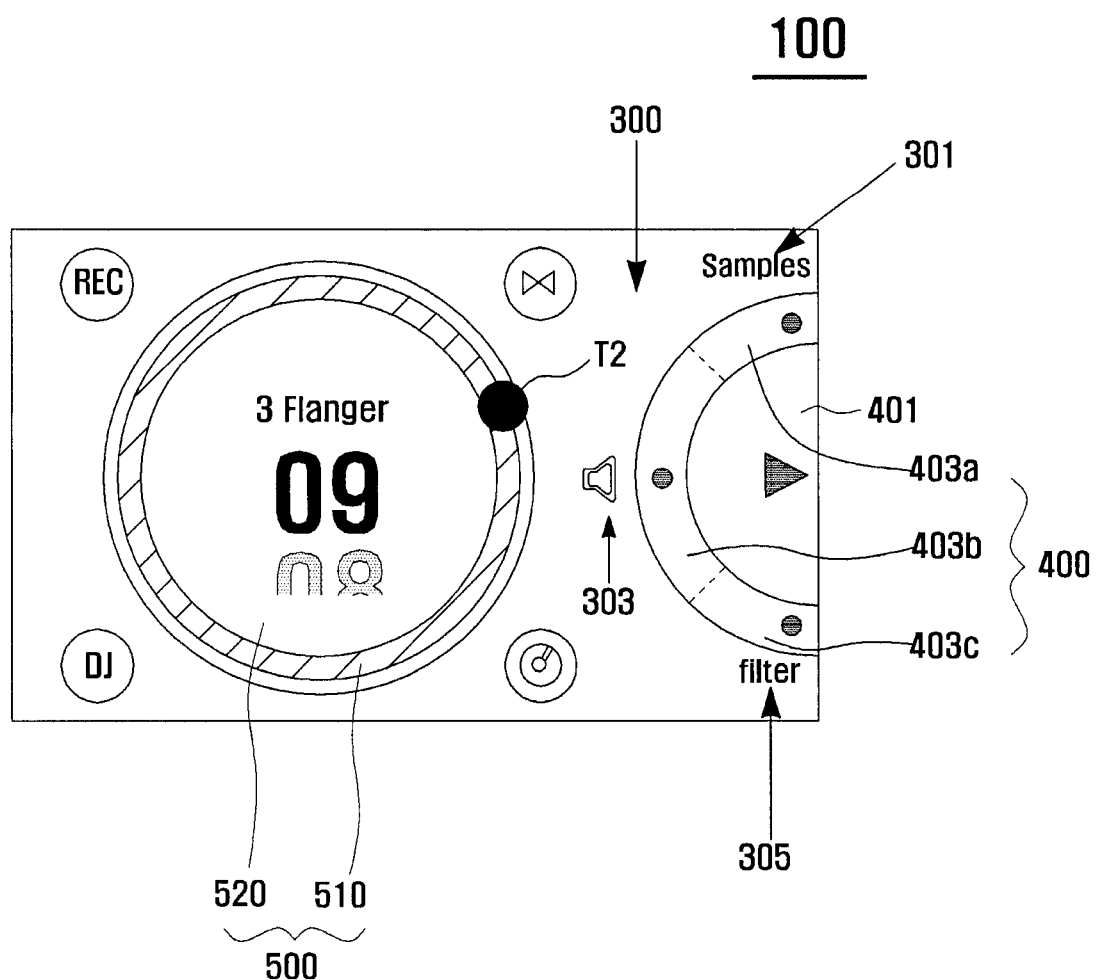
FIG. 4 is a diagram illustrating a screen for controlling a value of a sound resource adjustment item according to a first embodiment of the present invention.

FIG. 4 is a diagram illustrating the change of the auxiliary execution region 500 for performing the function of the sound resource adjustment of the multimedia item according to a first embodiment of the present invention.

Referring to FIGS. 3 and 4, if the user of the portable terminal indicates "3 Flanger" in the sample list using the first touch wheel region 403a and touches the confirmation key map region 401 to select the "3 Flanger" function for applying the corresponding Flanger function to the current multimedia item, the portable terminal includes a display means 100 as shown in FIG. 4. That is, the display means 100 of the portable terminal includes the auxiliary wheel region 510 for adjusting the "3 Flanger" function selected in FIG. 3 and the auxiliary execution region 500 including the auxiliary information display region 520. The auxiliary wheel region 510 is a region temporarily activated for adjusting the "3 Flanger" function, which recognizes the touch event of the user, generates the drag signal according to the direction of the drag signal, and transfers the generated drag signal to the controller of the portable terminal. For example, the user of the portable terminal performs the drag action of touching the specific point of the auxiliary wheel region 510, i.e. performing the second touch T2, and rotating in a predetermined direction. Then, the auxiliary wheel region 510 recognizes the drag action according to the second touch T2 and rotation and generates the corresponding drag signal. The controller of the portable terminal controls and selects the adjustment value of the "3 Flanger" function according to the drag signal transferred from the auxiliary wheel region 510. For example, if the "3 Flanger" function is defined i to have total 10 values (step sizes), the controller of the portable terminal indicates a specific value among the 10 sizes according to the drag action. Accordingly, the auxiliary information display region 520 represents that the specific value of the "3 Flanger" function is indicated. Referring to FIG. 4, the auxiliary information display region 520 represents that a "09" value is currently indicated. The auxiliary information display region 520 can output a value greater to or less than the currently indicated value according to a direction of the drag signal generated in the auxiliary wheel region 510. If the user of the portable terminal touches the confirmation key map region 401 of the execution region 400 to select the corresponding value or generates the corresponding signal using other input means included in the portable terminal after the specific value, e.g. "09" is indicated, the indicated value can be selected. Herein, indexes corresponding to the size value outputted on the auxiliary information display region 520 can be displayed as touchable information, respectively. That is, the portable terminal controls and activates the touch sensor of the region in which the "09" index is located in the auxiliary information display region 520. Therefore, the user of the portable terminal can indicate any value from the values representing a plurality of sound resource adjustment values using the auxiliary wheel region 510 and determines the sound resource adjustment value by touching the indicated index or using the execution region.

Through generating the auxiliary wheel region 510, the execution region 400 can be divided into the first touch wheel 403a, the second touch wheel 403b, and the third touch wheel 403c. There is no region currently selected in the output region 300. Information for explaining the function of each region of the execution region 400 can be displayed in a same color or brightness. The confirmation key map region 401 of the execution region 400 generates the confirmation key signal for selecting the sound resource adjustment value in the auxiliary execution region 500 according to the touch event of the user.

Figure 5:
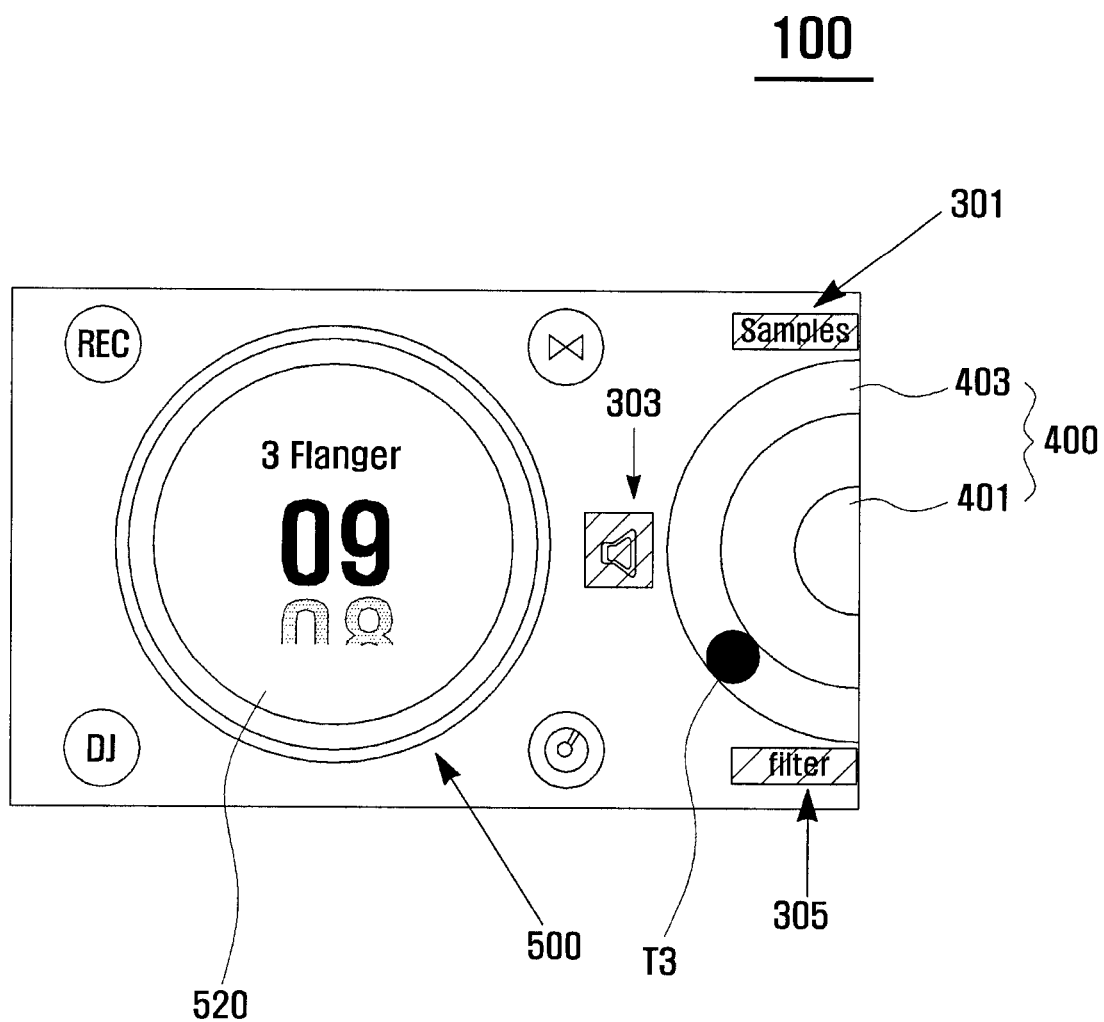
FIG. 5 is a diagram illustrating a screen for controlling a value of a sound resource adjustment item according to a second embodiment of the present invention.

FIG. 5 is a diagram illustrating the change of the auxiliary execution region 500 for adjusting the sound resource of the multimedia item according to a second embodiment of the present invention.

Referring to FIGS. 3 and 5, if the user of the portable terminal indicates "3 Flanger" in the sound resource adjustment list activated according to the selection of the first touch wheel region 403a and selects the "3 Flanger" function through the confirmation key map region 401 of the execution region 400 or the direct touch in FIG. 3, the display means 100 includes the auxiliary execution region 500 as shown in FIG. 5. That is, the auxiliary execution region 500 of the portable terminal includes the auxiliary information display region 520 representing the size value of the "3 Flanger" function selected in FIG. 3.

The auxiliary information display region 520 outputs the indexes corresponding to the size value of the "Flanger" function. At this time, the indexes outputted on the auxiliary information display region 520 can be displayed through activating the touchable information, i.e. the touch sensor. Accordingly, the user of the portable terminal indicates one of the indexes representing the plurality of sound resource adjustment values using the auxiliary wheel region 510 and determines the sound resource adjustment value through touching the indicated index.

The execution region 400 includes the touch wheel region 403 for controlling the display of a selected one of the index values corresponding to the size of the "3 Flanger" function on the auxiliary information display region 520 and the confirmation key map region 401 for generating the input signal for selecting the value of the index indicated on the auxiliary information display region 520.

At this time, the touch wheel region 403 can be operated to provide only the wheel function according to the touch without discrimination of the partial region. Accordingly, the color of "Samples" 301, "icon" 303, and "Filter" 305 outputted on the output region 300 can be changed to a color representing an inactivate state (which is represented with hash markings). To compare FIG. 5 with FIG. 3, the color of "Samples" 301 is displayed in a color or brightness different from that of other information according to the selection of the first touch wheel region 403a in FIG. 3, while the information is displayed in all the same color, but they can be adjusted in their color or brightness so as to indicate their inactivate state. If the touch, i.e. the third touch T3, is generated in the touch wheel region 403 according to the action of touching the specific point and the drag signal is generated according to the shift of the third touch T3 in a predetermined direction, the portable terminal controls and switches the locations of the index values outputted on the auxiliary information display region 520 according to the drag signal and change the value according to the corresponding drag signal. Then, if the confirmation key map region 401 is selected or directly touched in a state where the specific index value, e.g. "09", is indicated, the portable terminal determines the size value of the "3 Flanger" function as "09".

As described above, the interface display of the portable terminal according to the embodiment of the present invention supports the selection of the menu and the value associated with the function for adjusting the sound resource in the interface display without generating a separate interface display so as to support various functions to the display means 100 and the adjustment of the value of the specific function size for adjusting the sound resource of the multimedia item.

Figure 6:
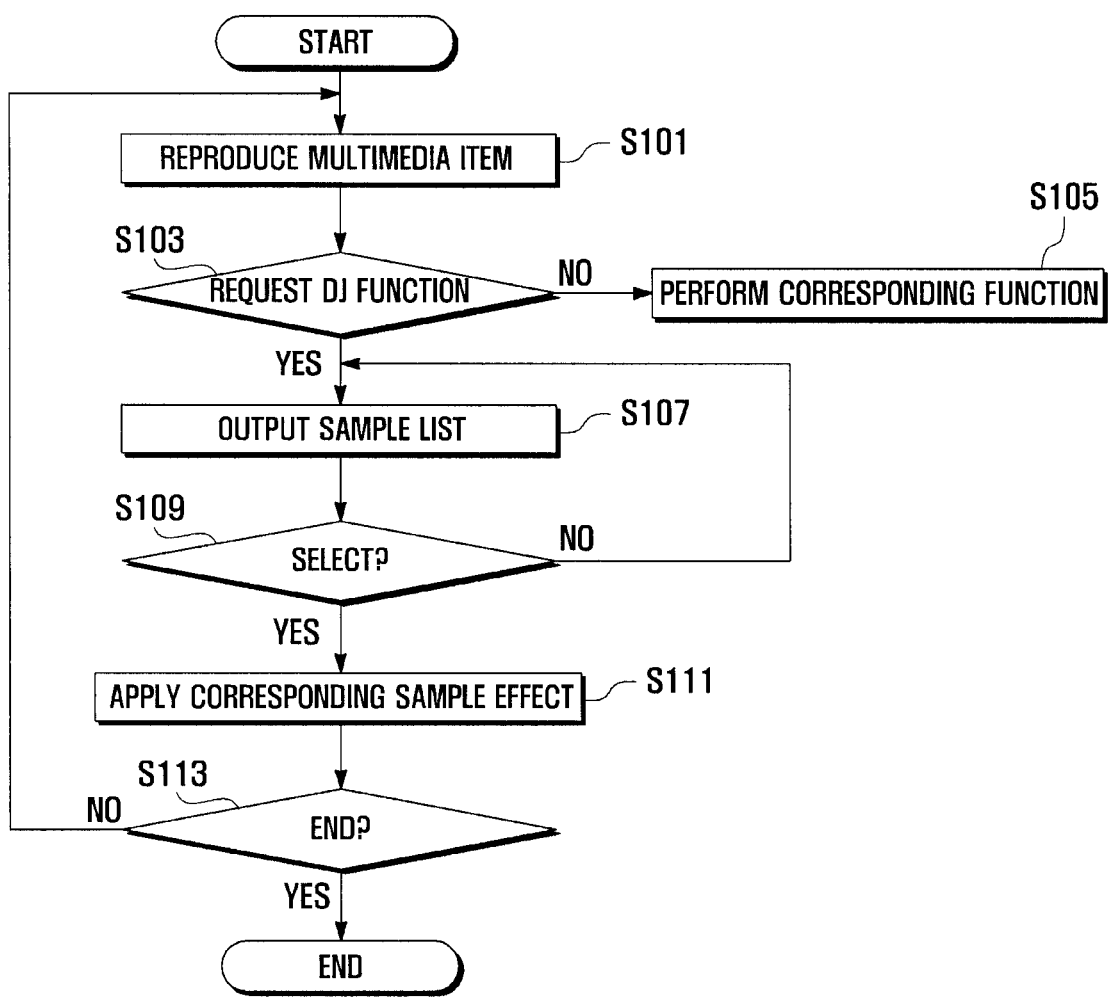
FIG. 6 is a flowchart illustrating a method for adjusting a multimedia item of a portable terminal according to an embodiment of the present invention.

FIG. 6 is a flowchart illustrating a method for adjusting a characteristic of a multimedia item according to an embodiment of the present invention. Prior to the description, the sample list to be described below may be a characteristic list of the multimedia item, e.g. the sound resource adjustment list, and the sample size may be a size value of each of the specific items in the characteristic list, e.g. the sound resource adjustment item.

Referring to FIG. 6, after the completion of the power supply and booting, the portable terminal reproduces a multimedia item selected by the user on the predetermined screen, e.g. the menu image, in step S101.

Then, the portable terminal identifies whether the DJ function for adjusting the characteristic of the multimedia item is requested in step S103. To this end, the portable terminal outputs the execution region including the touch wheel region capable of requesting the DJ function during the reproduction of the multimedia item and identifies whether the DJ function is requested according to the selection of the touch wheel region. Further, the portable terminal outputs the button control part and if the button for requesting the DJ function in the button control part is activated, the portable terminal recognizes it as the generation of the input signal for requesting the corresponding DJ function. In the meantime, if there is no request of the DJ function in step S103, the portable terminal proceeds to step S105 to control and perform a corresponding function, e.g. the function according to the reproduction of the multimedia item.

In the meantime, if the input signal for requesting the DJ function is generated in step S103, the portable terminal controls and outputs the auxiliary execution region and execution region on the display means. Further, the portable terminal outputs the sample list on the auxiliary execution region in step S107. The sample list is a menu list for adjusting a characteristic of the multimedia item, e.g. for adjusting the sound resource.

Next, the portable terminal identifies if any one sample is selected from the sample list in step S109, and controls and applies the corresponding sample effect in step S111. To this end, the portable terminal supports the selection of a sample from the sample list outputted on the auxiliary execution region according to a drag signal generated in the execution region. Further, the portable terminal includes the auxiliary wheel region and auxiliary information display region in the auxiliary execution region (see FIG. 3, for example) so as to adjust the value of the selected sample for applying the sample effect and represents the index of the sample in which the characteristic is currently adjusted and the currently indicated index among the indexes corresponding to the size value of the corresponding sample.

Thereafter, the portable terminal identifies the termination of the adjustment of the characteristic of the multimedia item in step S113. If the input signal for the termination is not separately generated, the step is branched into the previous step of step S101 to repeat the subsequent steps.

Next, the construction of the portable terminal for controlling the adjustment of the reproduction of the multimedia item according to the embodiment of the present invention will be described. Prior to the detailed description of the portable terminal of the present invention, the portable terminal of the present invention includes multiple forms of mobile communication terminal operated based on the communication protocols corresponding to various communication systems, information communication devices and multimedia devices including a Portable Multimedia Player (PMP), a digital broadcasting player, a Personal Digital Assistant (PDA), a portable game terminal, and a smart phone, and its application devices.

The schematic structure of the portable terminal of the present invention will be described with reference to FIG. 7.

Figure 7:
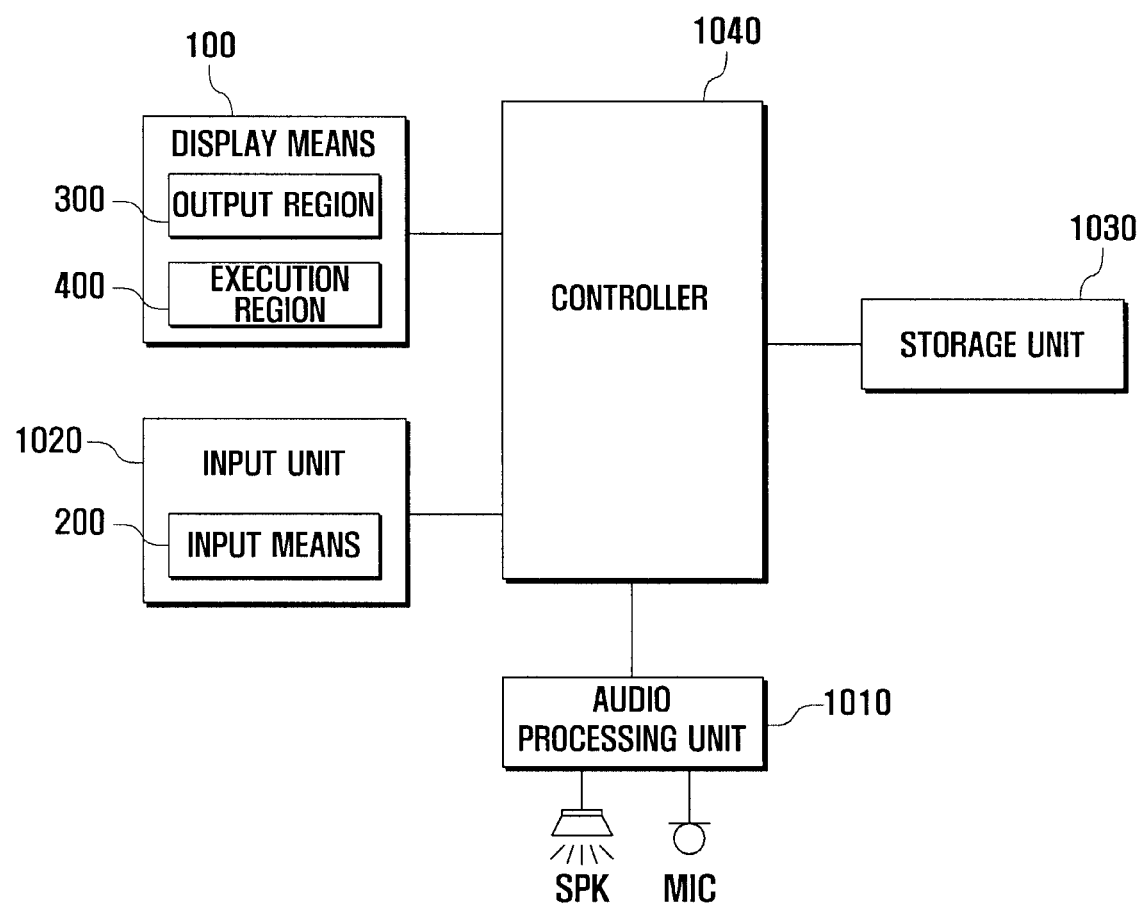
FIG. 7 is a block diagram schematically illustrating the construction of a portable terminal according to an embodiment of the present invention.

Here, the touch screen is representatively exemplified for the display means 100 of the present invention for the description in FIG. 7. However, the display means 100 of the present invention is not necessarily limited to the touch screen, and it is a matter of course to include the OLED, LCD, or the like.

Referring to FIG. 7, the portable terminal of the present invention includes an audio processing unit 1010, an input unit 1020, the display means 100, a storage unit 1030, a controller 1040, and the like. Further, the display means 100 includes the output region 300 and execution region 400 and the input unit 1020 includes the input means 200 in a form of a touch pad.

The audio processing unit 1010 reproduces various audio components (e.g. an audio signal according to the reproduction of the music file, etc.) generated in the portable terminal according to the user's selection. The audio processing unit 1010 converts the audio signal transferred from the controller 1040 into an analog signal to output the converted signal through a Speaker SPK. Accordingly, the audio processing unit 1010 outputs the audio signal to which the sound resource adjustment item and the value are applied during the reproduction of the multimedia item according to the selection of the sound resource adjustment item and the value of the corresponding item selected in the auxiliary execution region.

The input unit 1020 receives the input of various character information and transfers the input signal related to the set of various functions and the control of the function of the portable terminal to the controller 1040. The input unit 1020 generates the input signal according to the manipulation of the user and includes the input means 200, such as the keypad and touch pad for the generation of the input signal. According to the embodiment of the present invention, the input unit 1020 is formed in a touch pad to receive the input event of the user.

The input means 200 is a physical medium for processing the input of the user through the interaction between the user and the portable terminal, and in particular, includes a touch pad for receiving the input event of the user as shown in FIG. 1. If the input of an input event is detected in the touch pad, the input means 200 transfers the detected input event to the controller 1040. Then, the controller 1040 controls and indicates or selects the multimedia item corresponding to the input event.

The display means 100 is divided into the output region 300 and the execution region 400 according to the embodiment of the present invention. Further, if the display means 100 is formed as the touch screen, the display means 100 serves as an input/output means simultaneously performing an input function and a display function. The display means 100 displays the screen data generated during the performing of the function of the portable terminal and status information according to the key control of the user and function set. That is, the display means 100 displays various screen data related to the status and operation of the portable terminal. The display means 100 visually displays various signals and color information outputted from the controller 1040. Further, the display means 100 receives the input of the touch event of the user.

Especially, the display means 100 according to the embodiment of the present invention includes the output region 300 and the execution region 400. If the multimedia item is selected, the output region 300 outputs the auxiliary execution region for adjusting the sound resource of the multimedia item as described above. The auxiliary execution region outputs only the auxiliary information display region according to the menu or outputs it together with the auxiliary wheel region.

According to the embodiment of the present invention, the input means 200 of the input unit 1020 and the display means 100 are adjacently arranged so that the touch region of the input region 200 is adjacent to the execution region of the display means 100 to have an organically connected structure.

The storage unit 1030 includes Read Only Memory (ROM), Random Access Memory (RAM), or the like. The storage unit 1030 stores various data generated and utilized in the portable terminal. The data includes data generated according to the execution of an application of the portable terminal and every type of data generated using the portable terminal or received from external devices (an external portable terminal, personal computer, etc.) and stored. In particular, the data includes at least one multimedia item, a UI provided in the portable terminal, various setting information according to use of the portable terminal, and setting information of the auxiliary execution region according to the currently selected characteristic (e.g., sound resource adjustment) list. The setting information is information defined so as to differently set environment of the auxiliary execution region according to the selected sound resource adjustment list. For example, as described above, the setting information is defined so as for the auxiliary execution region to output information related to the multimedia item and reproduction information in reproducing the multimedia item. Further, the setting information is defined to include at least one between the auxiliary information display region outputting the corresponding sample list and the auxiliary wheel region capable of selecting the specific item in the sample list when supporting the function of selecting the sample list for adjusting the sound resource. When the specific sample is selected, the setting information defines the auxiliary information display region outputting the index value of the corresponding sample so as to select the size value of the specific sample in the auxiliary execution region and the auxiliary wheel region capable of indicating a selected one of the indexes of the sample. Here, the setting information defines a value that adjusts the touch setting so as to directly select the indexes outputted on the auxiliary information display region.

The controller 1040 performs the general control function for the portable terminal and controls the signal flow between blocks within the portable terminal. The controller 1040 controls the signal flow between the constructions, such as the audio processing unit 1010, the input unit 1020, the display means 100, and the storage unit 1030.

In particular, if the specific multimedia item is selected and reproduced according to the setting information stored in the storage unit 1030, the controller 1040 controls and outputs the information related to the corresponding multimedia item and reproduction information on the auxiliary execution region.

Further, the controller 1040 changes the environment of the auxiliary execution region according to the touch event generated in the execution region 400. That is, the controller 1040 controls and outputs the auxiliary execution region as the auxiliary information display region and the auxiliary wheel region based on the setting information.

In the meantime, for the convenience of description, FIG. 7 illustrates the schematic construction of the portable terminal. However, the portable terminal of the present invention is not necessarily limited to the above construction. Therefore, if the portable terminal of the present invention supports mobile communication service, the controller 1040 includes a baseband module for providing the mobile communication service of the portable terminal. As such, if the portable terminal of the present invention supports mobile communication service, the portable terminal includes a wireless communication unit that forms the communication channel established with a supportable mobile communication network to perform the communication including voice call, video telephony call, and data call. Further, the audio processing unit 1010 further includes a voice signal processing function according to the mobile communication service.

Further, the portable terminal of the present invention may further include the constructions, such as a camera module for photographing an object according to a form of the provision and obtaining the corresponding image data, a digital broadcasting reception module for receiving the digital broadcasting, a local area communication module for local area communication, and an Internet communication module for communicating with an Internet network to perform an internet function, which are not illustrated in FIG. 7 and not described in the above. Those constructional elements come to be much more diversified due to the convergence trend of the digital device so that every element cannot be listed. However, the constructional element having the equivalent level to the afore-mentioned constructional elements can be further included in the portable terminal. Further, it is a matter of course that specific blocks can be removed from or replaced with other blocks in the portable terminal of the present invention according to the form of the provision, which is easily understood by those skilled in the art.

In the above description of the embodiments with reference to FIGS. 1 to 7, it is representatively exemplified that the portable terminal includes a touch screen. However, the portable terminal of the present invention and its operation are not necessarily limited to a touch screen. Therefore, it is a matter of course that the portable terminal of the present invention and its operation can be operated in the combination of a display unit including the general LCD with the keypad or/and touch pad.

Further, in the above description, the execution region and auxiliary execution region of the present invention are shaped like a semi-circle or circle, but the present invention can have various shapes of outputted regions. That is, the execution region and auxiliary execution region can have various shapes, such as a polygon including a quadrangle, a triangle, a star shape, a hemisphere shape, and a sphere shape, according to the intention of the designer. In this respect, the execution region and auxiliary execution region of the present invention are not limited to their shapes. That is, it can be understood that the present invention easily supports the adjustment of the multimedia item based on the generation relation of the input signal inter-connected between the regions and an information output relation without additional steps of turning a page or shifting the screen in the display means in adjusting the multimedia item.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims. For example, while the invention has been described with regard to adjusting the value of a sound recording associated with a multimedia item (whether that item is just audio or a combination of audio and video material), with would be recognized that the operation of the present invention may be applied to other characteristics of a multimedia item such as a brightness, a contrast, a play speed, and a direction of play.

What is claimed is:

1. An apparatus for adjusting a characteristic of a selected multimedia item, comprising:
   a display means comprising:
      displaying an auxiliary execution region for displaying information for adjusting a characteristic of the multimedia item, and
      displaying a first execution region for generating an input signal capable of indicating or selecting information outputted on the auxiliary execution region; and
   a processor for controlling reproduction of the multimedia item and the adjustment of the characteristic according to the input signal,
   wherein the auxiliary execution region comprises:
   an auxiliary information display region displaying a list of selectable characteristics according to a touch event in the first execution region, and displaying an adjustable value of a selected one of the characteristics; and
   an auxiliary wheel region for generating an input signal for adjusting the displayed value of the selected characteristic according to a touch event on the auxiliary wheel region, to enable selection of the adjusted value,
   wherein the first execution region comprises: a touch wheel region for generating an input signal according to touch and drag operation, the touch wheel region comprises partial regions to which different respective functions are assigned; and a confirmation key map region for generating an input signal corresponding to a confirmation key, and
   wherein the touch and drag operation within a first partial region generates selections associated with the function of the first partial region, and when the touch and drag operation extends into an adjacent partial region, additional selections associated with the function of the first partial region are generated.

2. The apparatus of claim 1, wherein, if the touch event is generated in the touch wheel region, the auxiliary information display region switches locations of items included in the displayed list of characteristics according to the touch event to display the items or switches locations of values of the selected characteristic.

3. The apparatus of claim 1, wherein the touch wheel region comprises:
   a first touch wheel region for selecting a characteristic adjustment function;
   a second touch wheel region for activating a characteristic control function during the reproduction of the multimedia item; and
   a third touch wheel region for activating a filter function during the reproduction of the multimedia item.

4. The apparatus of claim 1, wherein the auxiliary information display region generates an input signal corresponding to selection of a list item according to a touch on the list item.

5. The apparatus of claim 1, wherein the auxiliary information display region generates an input signal corresponding to selection of the displayed value when the displayed value is touched.

6. A method for adjusting a characteristic of a multimedia item, comprising:
   outputting information related to the multimedia item and reproduction information according to reproduction of the multimedia item on an auxiliary execution region of a display means;
   displaying a first execution region on the display means comprising at least a touch wheel region;
   displaying, in the auxiliary execution region, a list of selectable characteristics of the multimedia item according to a touch event on the touch wheel region:
   detecting a touch input to select one of the characteristics displayed in the auxiliary execution region;
   displaying, in the auxiliary execution region, an adjustable value of the selected characteristic, and an auxiliary wheel region for generating an input signal to adjust the displayed value according to a touch event on the auxiliary wheel region, to enable selection of the adjusted value;
   dividing the touch wheel region into a plurality of partial regions;
   assigning a sound effect adjustment function, a volume control function, and a filter function to corresponding ones of the partial regions;
   selecting the sound effect function when a touch event is generated in a partial region to which the sound effect function is assigned; and
   setting the partial regions in order for an adjacent partial region to serve as a continuous region for the sound effect adjustment function when the sound effect adjustment function is selected.

7. The method of claim 6, wherein the touch input to select one of the characteristics is a touch input at a location in which the list is displayed.

8. The method of claim 6, further comprising displaying a respective information item adjacent to each partial region indicative of the function of the adjacent partial region.

9. The method of claim 8, further comprising emphasizing an information item when an adjacent partial region is selected via touch input thereon.

10. The method of claim 8, further comprising de-emphasizing each information item during touch input adjustment on the auxiliary wheel region.

11. The method of claim 9, further comprising selecting the adjusted value via touch input on a location at which the value is displayed.

12. The method of claim 11, wherein the touch wheel region is in the form of a semicircle displayed at an edge of the display means, and comprising a confirmation key map region at a central region of the semicircle to confirm selections of items displayed in the auxiliary execution region.

13. The apparatus of claim 1, wherein the characteristic is selected from the group consisting of; a sound resource, a brightness, a contrast, a play speed, and a direction of play.

14. A method for adjusting a characteristic of a multimedia item, comprising:

outputting information related to the multimedia item and reproduction information according to reproduction of the multimedia item on an auxiliary execution region of a display means;

displaying a first execution region on the display means; and displaying, in the auxiliary execution region, a list of selectable characteristics of the multimedia item according to a touch event on the first execution region, wherein the first execution region comprises a continuous region for generating an input signal according to a touch and drag gesture, the continuous region comprises partial regions to which different respective functions associated with the multimedia item are assigned, wherein a touch and drag beginning in each partial region generates selections for the function associated with that partial region, wherein a touch and drag beginning in a first partial region and extending into an adjacent partial region generates additional selections associated with the function assigned for the first partial region.

* * * * *